(12) United States Patent
Boutaghou

(10) Patent No.: US 6,490,134 B2
(45) Date of Patent: Dec. 3, 2002

(54) PATTERNED AND DIRECTIONAL SELECTIVE ROUGHENING OF A SLIDER AIR-BEARING SURFACE

(75) Inventor: Zine Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 140 days.

(21) Appl. No.: 09/758,851

(22) Filed: Jan. 11, 2001

(65) Prior Publication Data

US 2002/0051316 A1 May 2, 2002

Related U.S. Application Data

(60) Provisional application No. 60/175,611, filed on Jan. 11, 2000.

(51) Int. Cl.[7] ................................................. G11B 5/60
(52) U.S. Cl. ................................ 360/235.7; 360/235.6; 360/235.9
(58) Field of Search ........................... 360/235.5, 235.6, 360/235.7, 235.9, 235.4, 236.4, 236.5, 236.7

(56) References Cited

U.S. PATENT DOCUMENTS 6,229,671 B1 * 5/2001 Boutaghou et al. ...... 360/235.7
6,424,495 B1 * 7/2002 Kobayashi et al. ...... 360/235.7

* cited by examiner

Primary Examiner—Robert S. Tupper

(57) ABSTRACT

An information handling system, such as a disk drive, includes a base, a disk stack rotatably attached to the base, and an actuator assembly movably attached to the base. The actuator assembly also includes a load spring and a slider attached to said load spring. The slider includes an air-bearing surface which has roughened contact surface areas to reduce stiction in a contact start stop drive or in a drive that parks the slider on a ramp.

20 Claims, 10 Drawing Sheets

PATTERNED AND DIRECTIONAL SELECTIVE ROUGHENING OF A SLIDER AIR-BEARING SURFACE

RELATED APPLICATION

This application claims the benefit of U.S. Provisional application Ser. No. 60/175,611, filed Jan. 11, 2000 under 35 USC119(e).

FIELD OF THE INVENTION

The present invention relates to the field of mass storage devices. More particularly, this invention relates to a disk drive which includes a slider having a roughened air-bearing surface.

BACKGROUND OF THE INVENTION

One of the key components of any computer system is a place to store data. One common place for storing data in a computer system is on a disk drive. The most basic parts of a disk drive are a disk that is rotated, an actuator that moves a transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk. The magnetic transducer translates electrical signals into magnetic field signals that actually record the data "bits."

The transducer is typically housed within a small ceramic block called a slider. The slider is passed over the rotating disk in close proximity to the disk. The transducer can be used to read information representing data from the disk or write information representing data to the disk. When the disk is operating, the disk is usually spinning at relatively high revolutions per minute ("RPM"). A current common rotational speed is 7200 RPM. Rotational speeds in high-performance disk drives are as high as 10,000 RPM. Higher rotational speeds are contemplated for the future.

The slider is usually aerodynamically designed so that it flies on the cushion of air that is dragged by the disk. The slider has an air-bearing surface ("ABS") which includes rails and a cavity between the rails. The air-bearing surface is that surface of the slider nearest the disk as the disk drive is operating. Air is dragged between the rails and the disk surface causing an increase in pressure which tends to force the head away from the disk. Simultaneously, air rushing past the depression in the air-bearing surface produces a lower than ambient pressure area at the depression. This vacuum effect counteracts the pressure produced at the rails. The opposing forces equilibrate so the slider flies over the surface of the disk at a particular fly height. The fly height is the thickness of the air lubrication film or the distance between the disk surface and the transducing head. This film minimizes the friction and resulting wear that would occur if the transducing head and disk were in mechanical contact during disk rotation.

The best performance of the disk drive results when the slider is flown as closely to the surface of the disk as possible. In operation, the distance between the slider and the disk is very small; currently "fly" heights are about 1–2 micro inches.

Information representative of data is stored on the surface of the memory disk. Disk drive systems read and write information stored on tracks on memory disks. Transducers, in the form of read/write heads attached to the sliders, located on both sides of the memory disk, read and write information on the memory disks when the transducers are accurately positioned over one of the designated tracks on the surface of the memory disk. The transducer is also said to be moved to a target track. As the memory disk spins and the read/write head is accurately positioned above a target track, the read/write head can store data onto a track by writing information representative of data onto the memory disk. Similarly, reading data on a memory disk is accomplished by positioning the read/write head above a target track and reading the stored material on the memory disk. To write on or read from different tracks, the read/write head is moved radially across the tracks to a selected target track. The data is divided or grouped together on the tracks. In some disk drives, the tracks are a multiplicity of concentric circular tracks. In other disk drives, a continuous spiral is one track on one side of a disk drive. Servo feedback information is used to accurately locate the transducer. The actuator assembly is moved to the required position and held accurately during a read or write operation using the servo information.

During the operation of a disk drive sometimes the slider may contact the surface of the disc. Such a contact is not intended and may happen during loading and unloading in a disc drive which includes a ramp or may occur while the slider is flying over the disc surface in any type of disc drive, such as a contact start stop ("CSS") drive. Such a contact event is undesirable since the contact event may result in lost data. It has been postulated, that most of the data loss during contact between the slider and the disc is due to frictional heating during the contact event. A series of experiments where a ball is dropped on a stationary data zone resulted in no data loss. The same ball dropped in the data zone while the disc was spinning or moving resulted in data loss. Frictional heating is believed to be the cause for the data loss based on the above mentioned series of experiments. Frictional heating also causes degradation of the lubricant on the surface of the disc. Lubricant degradation further increases frictional heating since, if the lube has degraded, the slider is essentially contacting an unlubricated disc surface during a contact event.

Thus, there is a need for a method and apparatus for reducing the frictional heating produced between the surface of the disk and the slider. There is also a need for a method and apparatus that prevents or greatly reduces data loss that may result from a contact event. There is also a need for a method and apparatus that provides for reduced friction forces during a contact event and yet still provides a stable air-bearing surface on the slider. The method must also produce an air-bearing that is rugged and durable enough to last for the life of the disk drive.

SUMMARY OF THE INVENTION

An information handling system, such as a disk drive, includes a base, a disk stack rotatably attached to the base, and an actuator assembly movably attached to the base. The actuator assembly also includes a load spring and a slider attached to said load spring. The slider and load spring are attached to form a gimballing connection between the slider and the load spring. The slider includes an air-bearing surface which has a contact area. The slider also includes a transducer. The transducer is typically located near said contact area. The contact area includes a roughened surface portion and a smooth surface portion. The smooth surface portion is adjacent the transducer. The roughened surface portion is rougher than the smooth surface portion. The roughened surface portion is also rougher than the other surfaces associated with the air-bearing surface of the slider.

The roughened surface portion of the contact area is formed in one of several ways. If the slider is comprised of a multi-phase material, a selective etchant can be applied to the contact area for a selected amount of time. The selective etchant will act to remove a portion of at least one of the phases of the material and will be less active or inactive in removing at least another of the phases of the material. The amount of material removed using the selective etchant will be determined by the concentration of the etchant as well as the amount of time the etchant is left on the surface of the multi-phase material. The grain size of the materials used in the multi-phase material can also be used to determine the surface roughness of the contact portion. If the body of the slider is made of a single-phase material, this technique requires removal of a portion of the contact area of the air-bearing surface. The next step includes depositing an etchable multi-phase material on the portion of the contact area. The selective etchant is then applied to the multi-phase material at the contact area. At least one of the phases is removed by the selective etchant to form a roughened surface. The selective etchant is typically a wet or chemical etchant that reacts with one of the phases of the multi-phase material.

The other process is a dry process that can be used on any material. Photoresist is applied to the contact area. The photoresist is exposed and developed in certain areas to form a defined pattern across the contact area. Dry etch removal techniques are then used to remove material of the slider such that the defined pattern is transferred onto the slider. The photolithography technique using a dry etch works on both single-phase and multi-phase materials.

Advantageously, a roughened portion of the contact surface reduces the stiction forces produced between the surface of the disk and the slider and allows landing of a slider onto a smooth disk. Furthermore, since a smooth disk can be used the spacing between the transducing head associated with the slider and the disk can be controlled and minimized to provide for an enhanced recording density of the information stored on the disk. The roughened contact area of the air-bearing surface not only reduces stiction forces between the disk and the slider, but also provides a stable air-bearing surface for the slider. The resulting air-bearing is rugged and durable. The materials used to form the roughened surface are removed so the only materials remaining are those already in the drive. Thus, outgassing problems are minimal.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
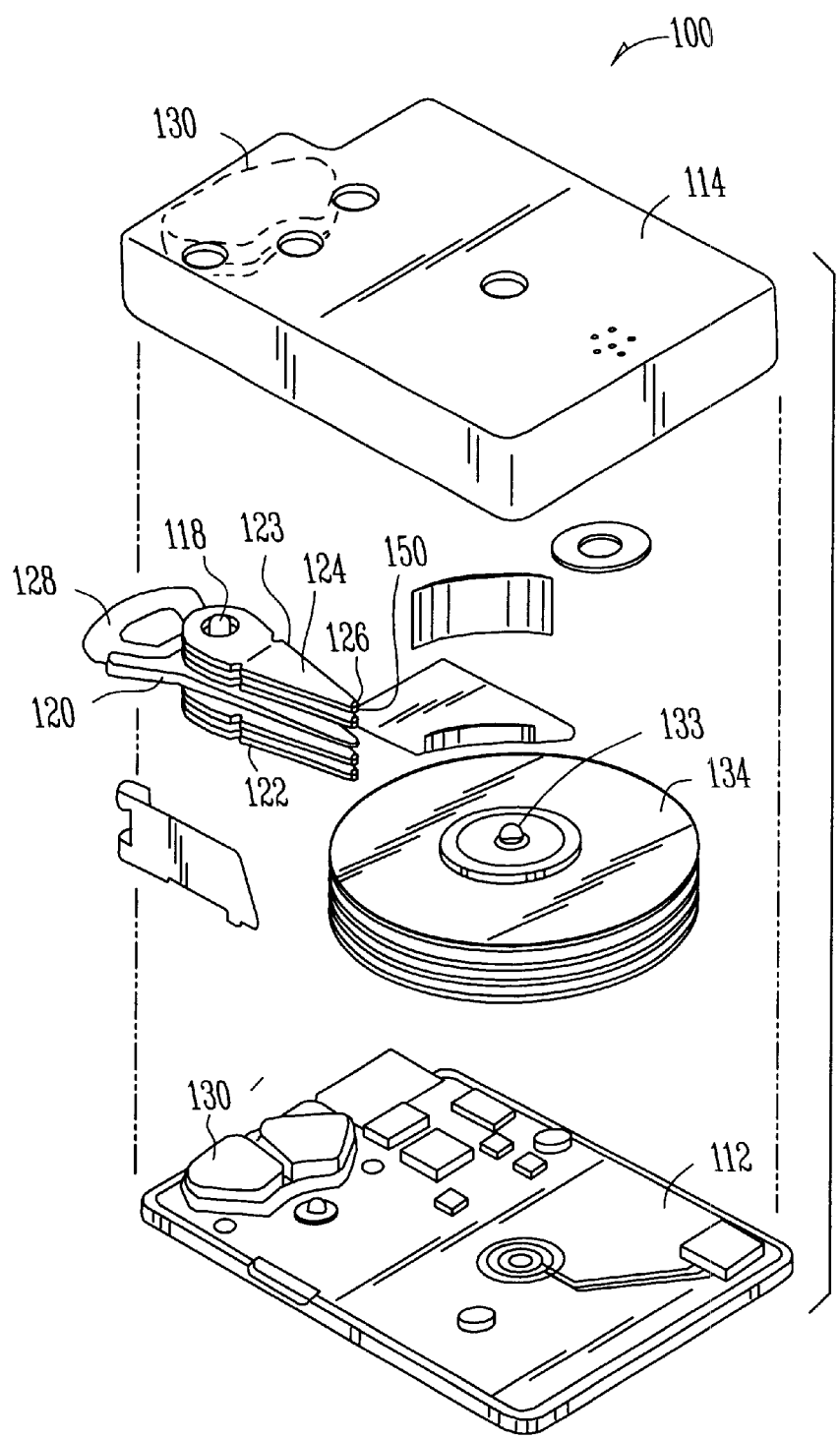
FIG. 1 is an exploded view of a disk drive with a multiple disk stack and a ramp assembly for loading and unloading transducers to and from the surfaces of the disks.

The invention described in this application is useful with all mechanical configurations of disk drives having either rotary or linear actuation. In addition, the invention is also useful in all types of disk drives including hard disk drives, zip drives, floppy disk drives and any other type of drives where unloading the transducer from a surface and parking the transducer may be desirable. FIG. 1 is an exploded view of one type of a disk drive 100 having a rotary actuator. The disk drive 100 includes a housing or base 112, and a cover 114. The base 112 and cover 114 form a disk enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer. On the end of the actuator arm assembly 120 opposite the load springs 124 and the sliders 126 is a voice coil 128.

Attached within the base 112 is a pair of magnets 130 and 130'. The pair of magnets 130 and 130', and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disk drive, the spindle motor is within the hub. In FIG. 1, a number of disks 134 are attached to the spindle hub 133. In other disk drives a single disk or a different number of disks may be attached to the hub. The invention described herein is equally applicable to such other disk drives.

Figure 2:
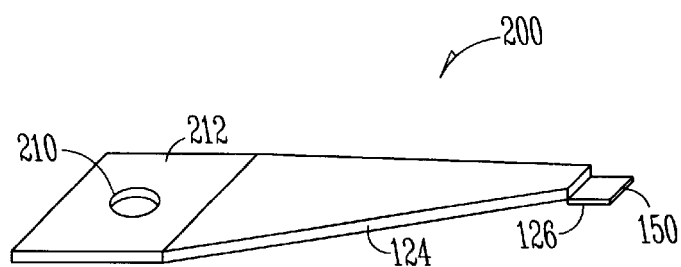
FIG. 2 is a perspective view of a load spring and an attached slider which form a head gimbal assembly.

FIG. 2 is a perspective view of a load spring 124 and attached slider 126 which form a head gimbal assembly 200. The load spring 124 is a triangular structure which acts as a cantilevered spring to place a small load onto the slider 126 when the slider 126 is in transducing relation with the disk 134. Load springs 124 are also commonly called load beams or suspensions by many in the disk drive industry. The load spring 124 is attached at its wider end to an actuator arm 123. The load spring 124 shown in FIG. 2 has a swage opening 210 and a swage plate 212 in the wider end. The swage opening 210 and swage plate 212 are used to attach the load spring 124 by a process referred to as swaging. Other attachment methods may also be used without departing from the spirit of this invention. Also attached to the load spring 124 is the slider 126. The transducer 150 is carried by or within the slider 126.

Moving the actuator assembly 120 moves all the load springs 124. In operation, the actuator assembly 120 is moved to a park position when the disk drive is powered down. Moving the actuator to the park position causes the sliders to move to a non-data area of the disk. The non-data area is typically at the inner diameter ("ID") of the disk 134. Once the actuator assembly 120 has moved the sliders 126 to the park position, the disk drive is powered down and the sliders land on the non-data area and skid to a halt. When the disk drive is powered on, the disks 134 are quickly accelerated until a relative velocity between the sliders 126 and the disk 134 is produced which causes the slider to lift off the surface of the disk 134. Once lift off of the slider 126 has occurred, the actuator assembly can be used to move the sliders 126 into an operating or transducing position over the area of the disk used to store information representative of data. The actuator assembly 120 can also be used to perform seeks to various data locations on the surface of the disk.

Figure 3:
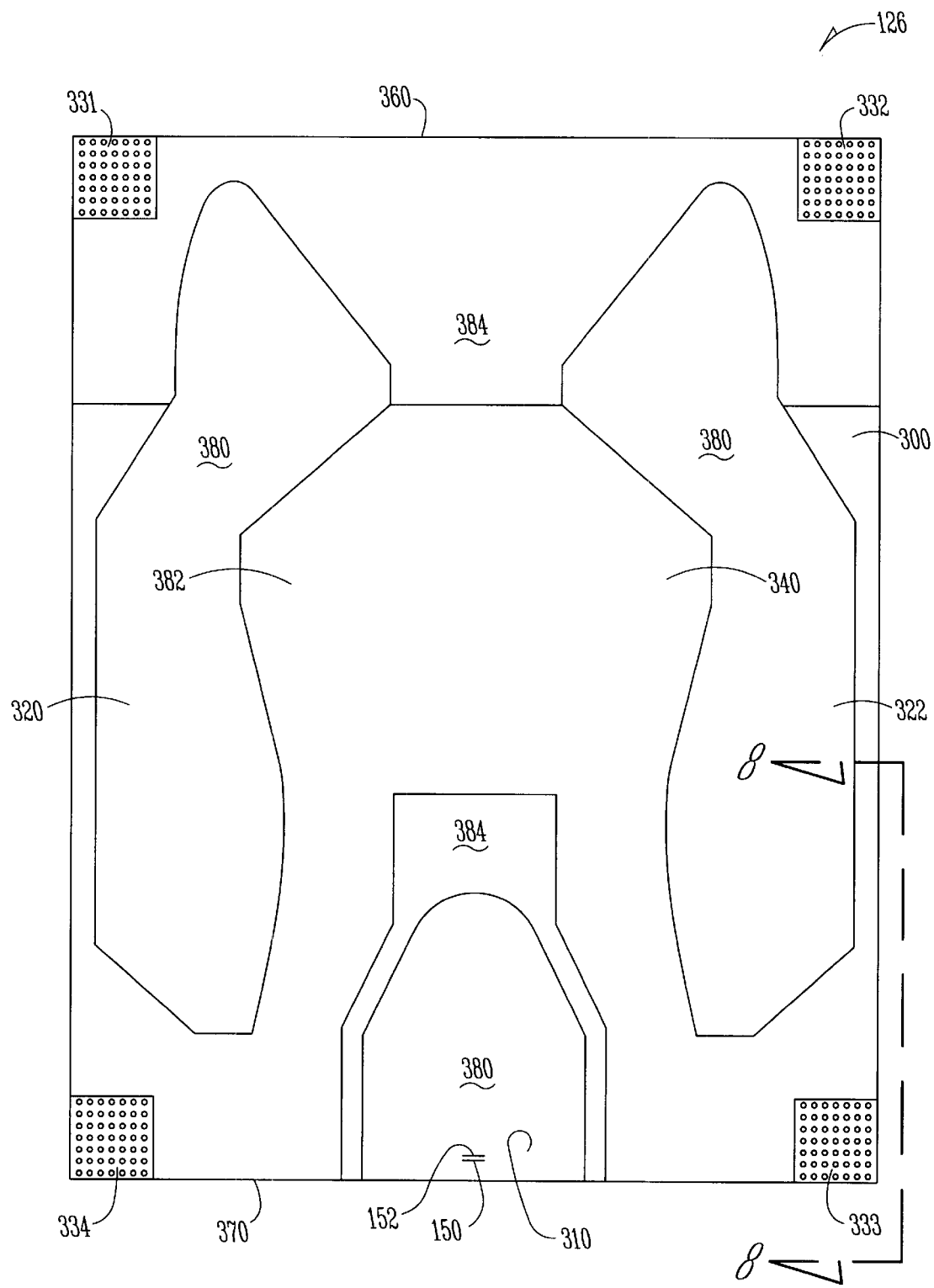
FIG. 3 is a bottom view of a slider showing the air-bearing surface.

FIG. 3 is a bottom view of a slider 126 showing an air-bearing surface 300. The air-bearing surface includes a center island 310, a first side rail 320 and a second side rail 322. The air-bearing surface 300 includes contact portions 331, 332, 333 and 334 which may contact the disk 134 during unexpected contact events between the slider 126 and the disc 134. The contact portions 331, 332, 333, 334 are located at the corners of the air bearing surface 300. Other portions of the air-bearing surface such as the side rails 320 and 322 may also contact the disc during a contact event. However, the most likely areas of the slider 126 to strike the disc 134 are the corners which are designated as contact portions 331, 332, 333 and 334. A cavity is typically formed between the side rails 320 and 322 as well as the center island 310. The cavity 340 is a noncontact portion of the air-bearing surface 300. The slider also has a leading edge 360 and a trailing edge 370. Positioned at or near the trailing edge 370 is the transducer 150. As shown in FIG. 3, the transducer fits within a slot 152 within the center island 310. The slider air-bearing surface 300 has two levels 380 and 382. The first level 380 is closest to the surface of the disc 134. The second level 382 of the air-bearing surface 300 is more distant from the surface of the disc 134. The first level includes the major surface of the side rails 320 and 382, and the center island 310 at the trailing edge 370. The second level 382 includes the cavity 340. Generally, the surfaces associated with the second level 382 do not contact the disc 134 during normal operation, either by a CSS drive or a drive with ramps. There is also a third level 384 which is in to mediate the first level 380 and the second level 382. Third level surfaces also do not generally contact the disc during normal operations. The contact portions 331, 332, 333, 334 are associated with levels other than the first level 380 and therefore are positioned where the slider does not normally contact the disc 134.

The contact surfaces 331, 332, 333 and 334 of the air-bearing surface 300 are roughened or textured, as depicted by the stippling in the corners or contact areas 331, 332, 333 and 334. By roughening or texturing the contact surfaces 331, 332, 333 and 334 of the air-bearing surface 300, the friction forces between the slider 126 and the disc 134 are reduced when compared to a slider without the roughened contact surfaces. The roughened surfaces at the corner contact points 331, 332, 333, 334 not only reduce the friction during an unintended contact between the slider 126 and the disc 134, but also reduce the frictional heating that results. Thus, by roughening or texturing the corner contact points 331, 332, 333, 334, the chances for loss of data resulting from an unintended contact event are also lessened.

Figure 4:
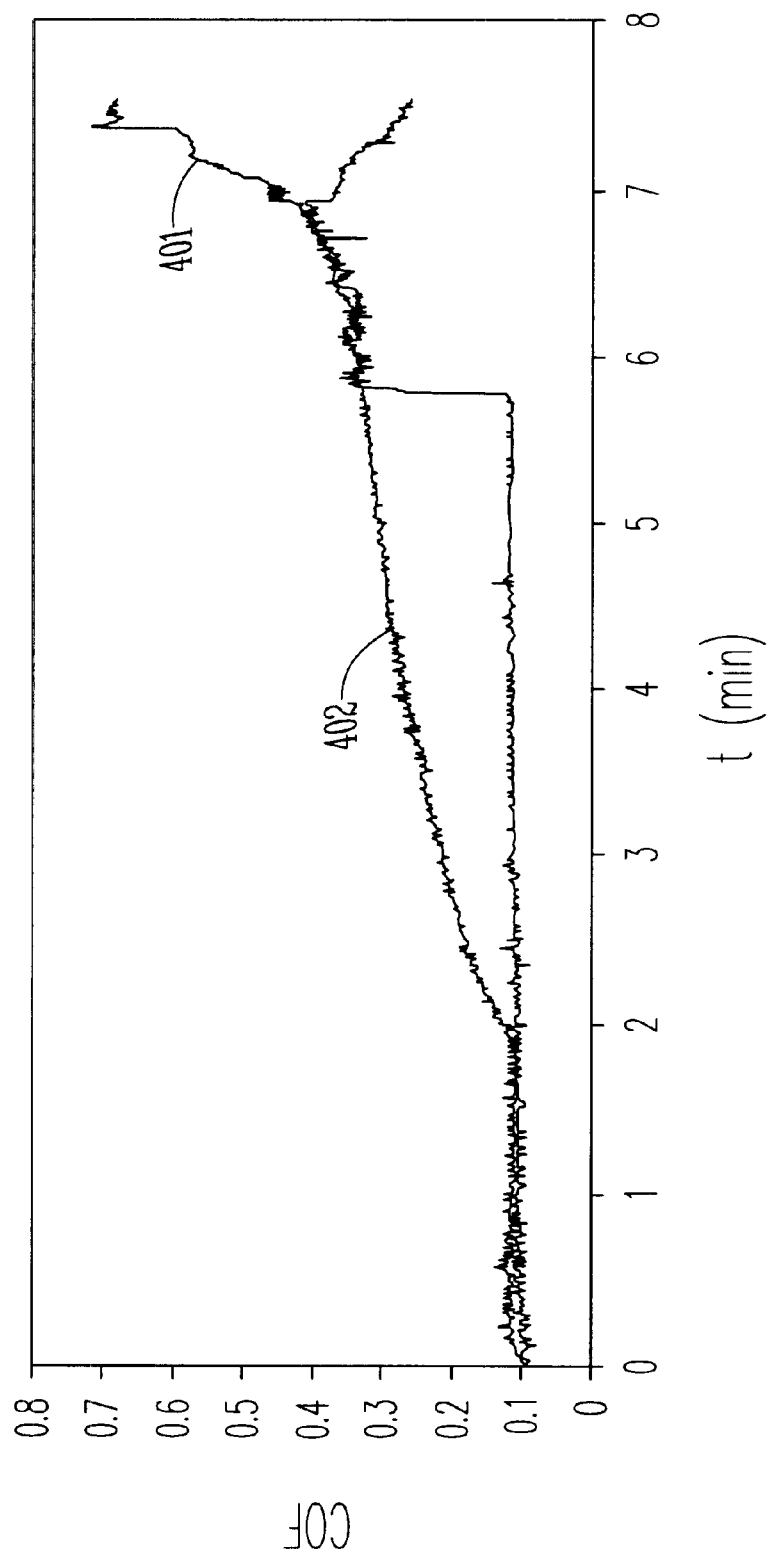
FIG. 4 is a graph comparing the friction of a nontextured slider and a textured slider.

FIG. 4 is a graph comparing the friction of a nontextured slider and the friction associated with a textured slider. The graph shown in FIG. 4 proves that microtexturing of sliders provides a substantial reduction in friction. The coefficient of friction associated with a nontextured slider is shown by a curve or plot 401. The coefficient of friction associated with a textured slider is shown by curve or plot 402. As can be seen from the plots 401 and 402 for the same level of interference, friction is reduced by almost four times when using a textured slider. Note that there is a substantial reduction in the friction during contact of textured sliders as depicted by curve 402. Also studies of contact start stop type disc drives show that the performance of a textured slider versus a nontextured slider is better in terms of friction. The stiction, or static friction, for the textured slider on a data zone is typically reduced by an order of magnitude. By reducing the amount of friction between the slider 126 and the disc 134 during contact of a slider 126 during an unintended contact event, the frictional heating associated with the unintended contact event will also be reduced. As mentioned previously, frictional heating is believed to the be the cause for data loss and lube degradation. Therefore, providing textured or roughened portions 331, 332, 333, 334 on the air-bearing surface 300 of the slider 126 in positions where unintended contact between the disc and slider 126 is likely to occur, then it will follow that frictional heating from such unintended contact events will also be reduced. Also reduced will be data loss from such unintended contact events. It should be noted that the textured areas 331, 332, 333 and 334 are positioned on the second level 382 of the air-bearing surface 300. The second level 382 is typically not contacted during normal operations of the disc drive in a contact start stop type disc drive or one that employs ramps to load and unload the discs. An additional benefit of placing the roughened or textured areas 331, 332, 333 and 334 at the second level 382 is that the liability or aerodynamic characteristics of the air-bearing surface 300 are either not affected or not substantially affected.

Figure 5:
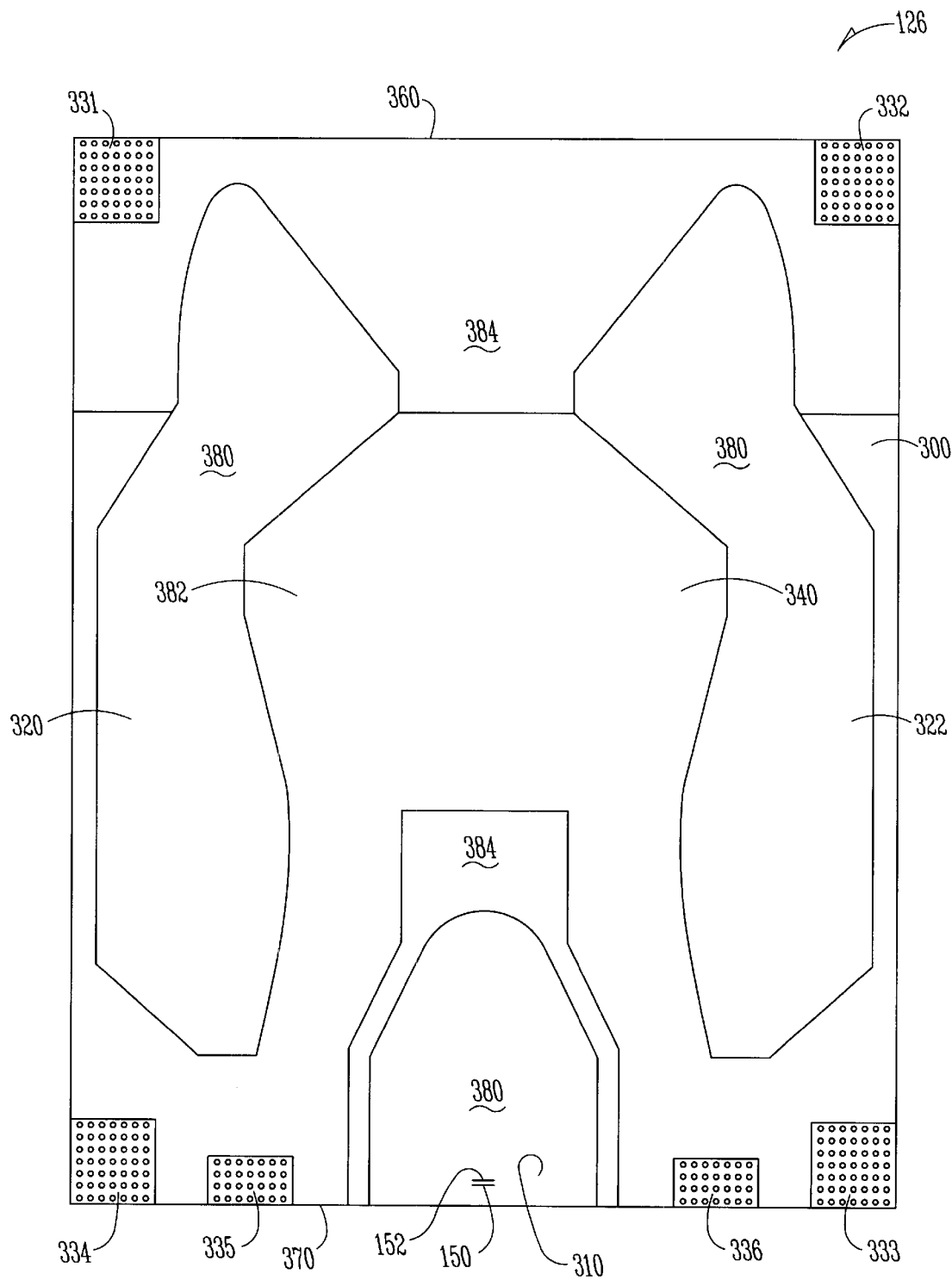
FIG. 5 shows the air bearing surface having textured contact areas at the trailing edge.

FIG. 5 shows an air-bearing surface 300 having a textured contact area at the trailing edge. The textured areas at the trailing edge 370 are depicted by reference numerals 335 and 336. It should be noted that the textured areas 335 and 336 are located on the second level 382 of the air-bearing surface 300.

Figure 6:
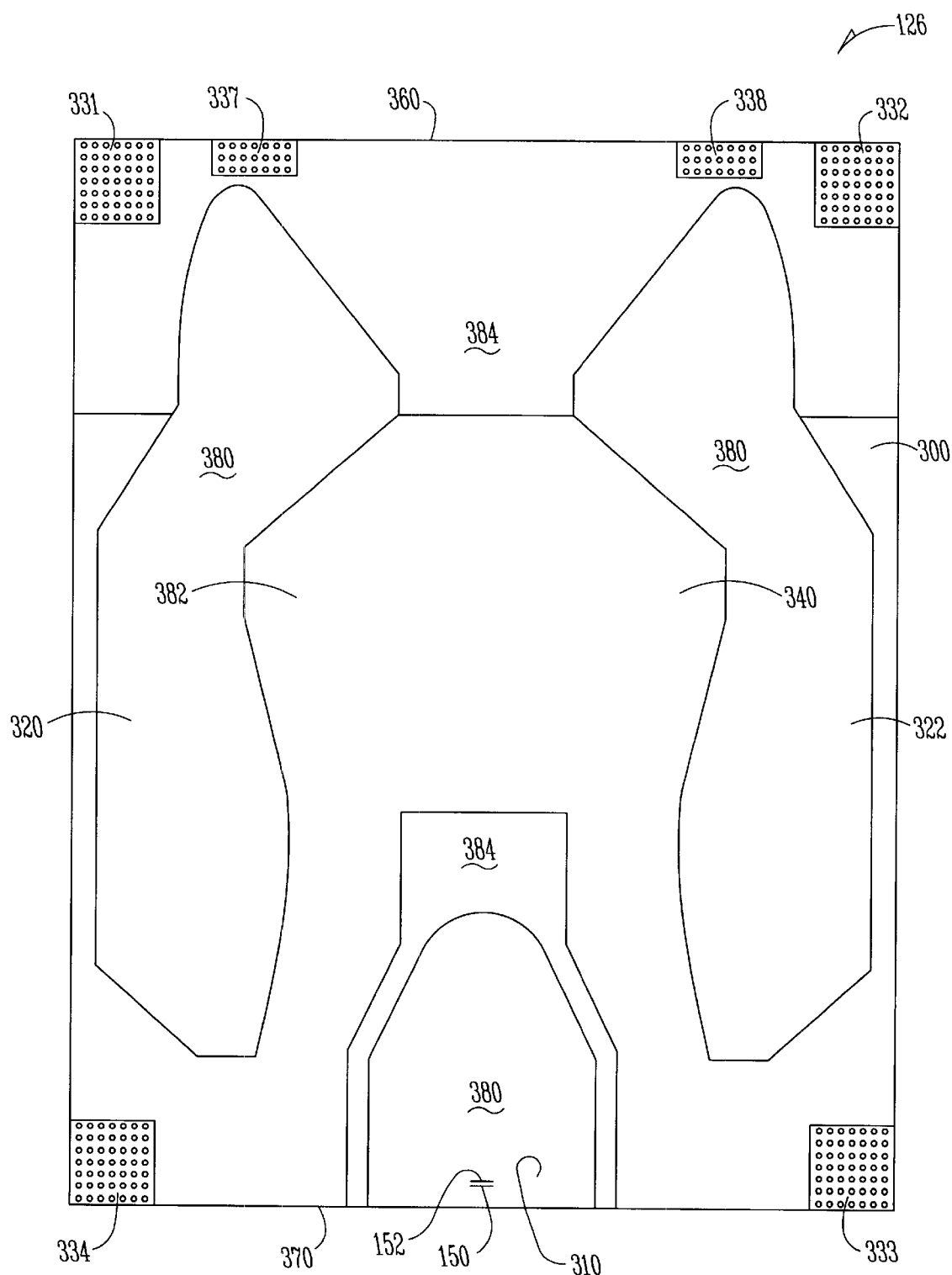
FIG. 6 shows the air bearing surface having contact areas at the leading edge.

FIG. 6 shows an air-bearing surface 300 having textured contact areas 337 and 338 at the leading edge 360 of the slider 126. In this particular instance, the textured areas 337 and 338 are on the third level 384 which is, of course, different from the first level 380 which is more determinative of the aerodynamic qualities of the slider 126. It should be noted that the textured areas 331, 332, 333, 334, 337 and 338 may be used singly or in any particular combination and still be within the scope of this invention. Furthermore, it should be noted that the textured areas may be placed in any location where unintended contact may occur, such as along the outer edge of the second level 382 of the air-bearing surface 300 between the side rails 320 and 322 and the edge of the slider. Another embodiment could include texturing the second level 382 with the exception of the second level 382 that is associated with the cavity 340 between the first rail 320 and the second rail 322.

There are several methods used to form the textured or roughened surface portions 331, 332, 333, 334, 335, 336, 337 and 338. A random pattern of roughening can be formed by using a phase-selective etchant on a multi-phase material. A dry plasma etch can be used on any material and forms a more regular roughened pattern. These various techniques will now be discussed in the below paragraphs.

Sliders 126 have typically been made out of a multi-phase material. Sliders are made from a ceramic aluminum titanium carbide (AlTiC). A multi-phase material means that there is more than one component or phase of the material. For example, in a slider made of AlTiC, one of the components is the titanium carbide (TiC). Although sliders 126 have been made of multi-phase material in the past, sliders made of a single-phase material are being contemplated.

Formation of Roughened Surface on a Slider Made of Multi-Phase Material

Figure 7:
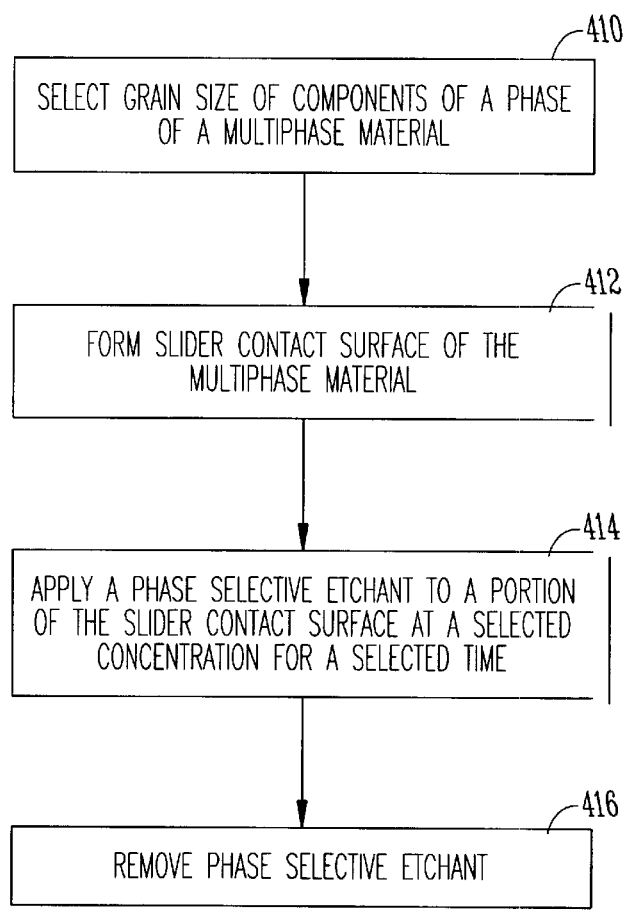
FIG. 7 is a flow chart showing the steps in applying the wet etch surface treatment to contact areas of the air-bearing surface of the slider.

In one preferred embodiment, the entire slider 126 is made of a multi-phase material, such as AlTiC and a phase-selective etchant is applied to a portion of the air-bearing surface 300 to produce a textured or roughened surface portion 331, 332, 333, 334, 335, 336, 337 and 338. FIG. 7 is a flow diagram showing the steps in roughening an air-bearing surface 300 using this method. The initial step in using this method is to select the grain size of the components of a multi-phase material, as depicted by 410. AlTiC is a multi-phase material. The grain size of one of the phases is selected to determine the coarseness or roughness of the textured or roughened surface area 331, 332, 333, 334, 335, 336, 337, 338. In other words, the coarser the grain size, the rougher the textured area 331, 332, 333, 334, 335, 336, 337, 338 will be. Next, the slider 126 surface to be textured with the multi-phase material as shown by 412. The slider surface to be textured can be formed either by forming the entire slider out of a multi-phase material or, in the alternative, a portion of the surface to be textured can be removed and replaced with a multi-phase material.

Next, a phase-selective etchant is applied to at least a portion of the slider surface to be textured. The phase-selective etchant removes at least one component of the multi-phase material over time. For example, the phase-selective etchant such as nitric acid ($HNO_3$) is used to preferably etch the titanium carbide (TiC) from the AlTiC slider to cause the contact surface to develop a roughness greater than the original surface. The roughness can be controlled by controlling the concentration of the phase-selective etchant, as well as the amount of time the phase-selective etchant is applied to the multi-phase material, as shown by 414 in FIG. 7. In other words, if deeper grooves are to be made to form a textured contact surface area 331, 332, 333, 334, 335, 336, 337, 338, a phase-selective etchant can be left on the surface area to be roughened, for a longer time period. Alternatively, the concentration of the phase-selective etchant can be increased so that the phase-selective etchant removes one of the components of the phase-selective material more quickly over the same amount of time. Once the phase-selective etchant has been applied to the surface for the selected amount of time, the phase-selective etchant is removed as shown by 416.

Figure 8:
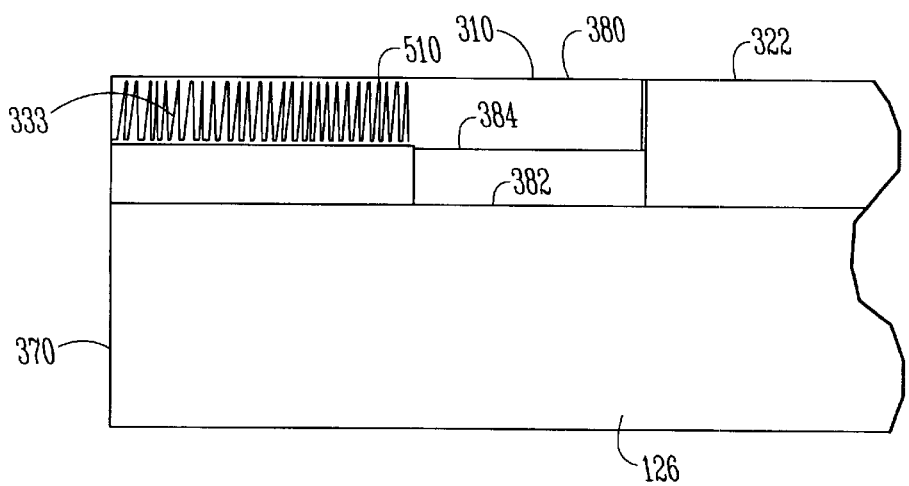
FIG. 8 is a cutaway side view along line 8—8 of the textured portion 333 of the slider air-bearing surface shown in FIG. 3.

FIG. 8 shows the result of applying a phase-selective etchant to a slider 126 including a multi-phase material. A contact area 333 having a roughened contact surface is shown in FIG. 8. It should be noted that other types and shapes of roughened surfaces could also be shown, such as associated with contact pads 331, 332, 334, 335, 336, 337 or 338 as shown in FIGS. 3, 5 and 6. It should also be understood that the surface treatment is equally applicable to all types of contact surfaces. The contact surface 333 that results is comprised of a roughened portion which has been removed from the second level 382 of the air-bearing surface. Also shown is the center island 310 having first level 380 and third level 384 as well as the side rail 322.

The textured or roughened contact surface 333 that results is a plurality of pebble-shaped elements 510. The pebble-shaped elements 510 are random in their orientation as well as in their spacing. The height of the pebble-shaped elements 510 is determined by the grain size of the phase of the multi-phase material which is unaffected or not as affected by the phase-selective etchant, the concentration of the phase-selective etchant, as well as the amount of time the phase-selective etchant is applied to the contact surface 333. By varying these factors, the size of the pebble-shaped elements 510 can be varied.

Formation of Roughened Surface Using Slider Made of a Single-Phase Material

Figure 9:
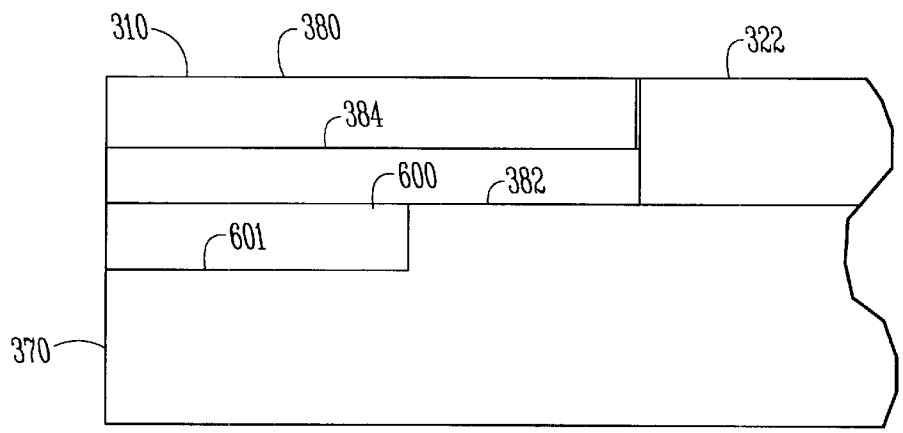
FIG. 9 is a cutaway side view along the side of the slider 126 near area 333 after a portion of the air-bearing surface has been removed.

As mentioned previously, it is contemplated that a slider 126 may be made with a single-phase material, such as a single-phase ceramic. Initially, a portion of the slider 126 associated with the area to be textured, such as 333, is removed, as shown by FIG. 9. FIG. 9 is a cut-away side view of the textured portion 333 of the slider air-bearing surface 300. The portion 600 that has been removed is also shown in FIG. 9. The portion 600 that is removed forms a depression 601 in the second level 382. The material removed from the slider 126 to form the depression 601 is typically removed by ion milling.

Figure 10:
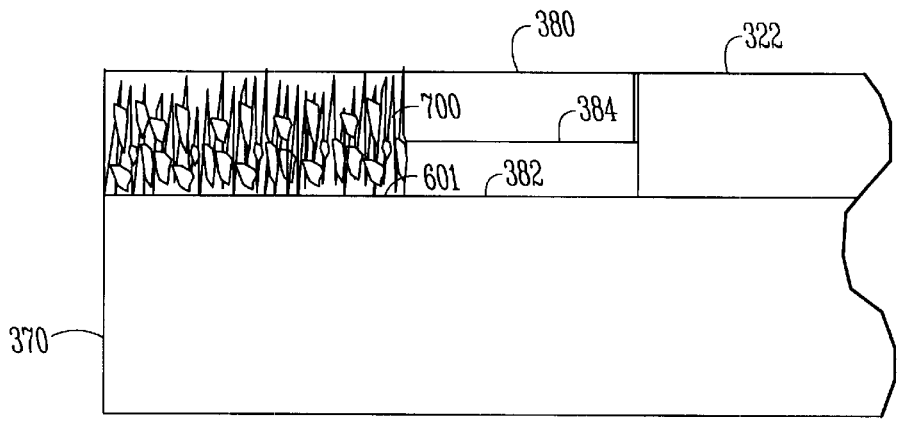
FIG. 10 is a cutaway side view along the side of the slider 126 near area 333 after a two-phase material has been deposited in the depression.

As shown in FIG. 10, a two-phase material 700 is deposited onto or into the depression 601. Certain elements of the slider 126 have been removed for the sake of clarity. Again, the grain size of the multi-phase material can be selected to control the resulting roughness of the contact surface. As can be seen, the multi-phase material 700 is deposited to a height which is greater than the height of the original material which was removed. In other words, the multi-phase material 700 is added until the height of the material is higher than the second level 382 of the air bearing surface 300.

Figure 11:
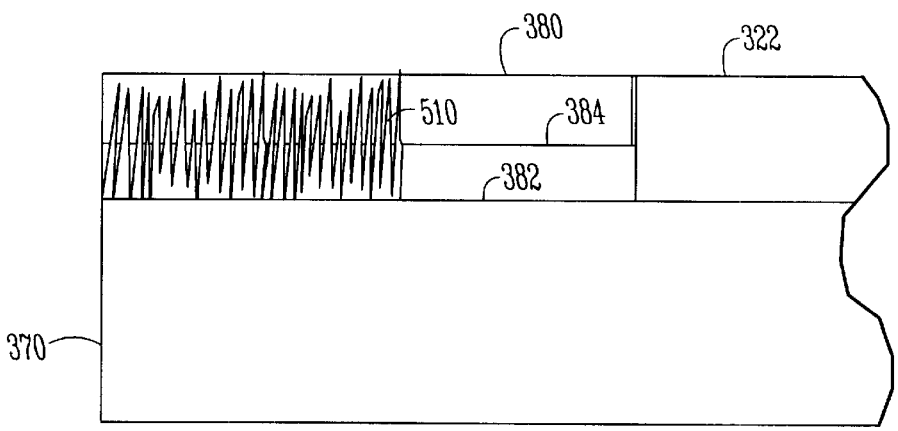
FIG. 11 is a cutaway side view along the side of the slider 126 near area 333 after applying a phase-selective etchant to remove a portion of the two-phase material.

A phase-selective etchant is then applied to the multi-phase material 700 for a selected amount of time and at a selected amount of concentration. FIG. 11 is a cutaway side view of the contact portion 333 of the air-bearing surface 300 after applying a phase-selective etchant to remove a portion of the two-phase material 700. The resultant structure is a series of pebble-shaped elements 510. The height of the pebble-shaped elements 510 is higher than the height of the second level 382 of the air-bearing surface contact surface 330 in which the transducer 150 is positioned. Of course the height difference in FIG. 8 between the needle-like elements 510 and the surface in which the transducer 150 is positioned is exaggerated. However, an additional amount of protrusion of the texture with respect to the second level 382 may be desirable to limit the friction between the slider 126 and the disc 134 when contact occurs at unintended contact pad 333.

Formation of Roughened Surface using Photolithography

The roughened contact surface features 331, 332, 333, 334, 335, 336, 337, 338 can also be formed using photolithography to define a pattern. A first photolithographic process uses a mask to expose certain portions of a photoresist layer. A second photolithographic process uses a split laser beam to expose certain portions of a photoresist layer.

Formation of Roughened Surface using Image Pattern

Figure 12A:
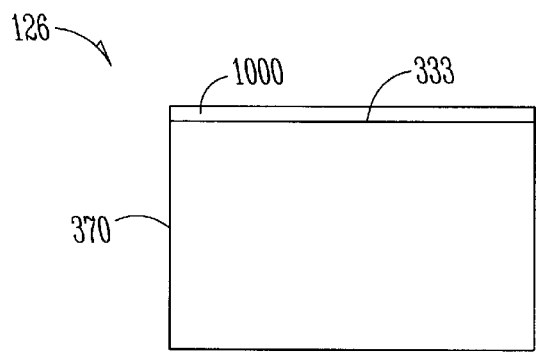
FIGS. 12A–12D show cross-sectional views of successive process steps for applying a surface treatment using photolithography and a dry or plasma etch to portions of the contact areas of the air-bearing surface of the slider in accordance with an embodiment of the invention.

FIGS. 12A–12D show cross-sectional views of successive process steps for applying a roughening surface treatment using photolithography and a dry or plasma etch to portions of a contact surface feature, such as the contact surface 333 of the air-bearing surface 300 of the slider 126 in accordance with another embodiment of the invention. As shown in FIG. 12A, a photoresist 1000 is deposited as a continuous layer on contact surface 333. The photoresist is deposited as a continuous layer over the entire contact surface 333. The photoresist can also be deposited as a continuous layer on the entire air-bearing surface 300 of the slider 126 which includes the contact surface 333 and the other contact surface features 331, 332, 334, 335, 336, 337, 338. In other words, forming one or more contact features such as 331, 332, 333, 334, 335, 336, 337 or 338 can be done simultaneously. In addition, if other features of the air-bearing surface 300 are formed using a photolithographic process, the forming of the contact features can be incorporated with forming the other features.

Figure 12B:
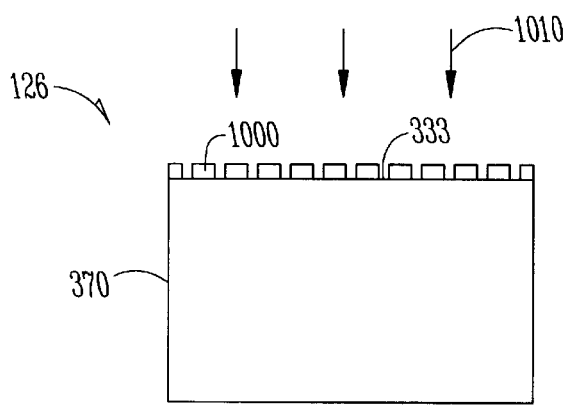

The photoresist is selectively irradiated, as depicted by the arrows 1010 shown in FIG. 12B, using a photo lithographic system, such as a step and repeat optical projection system, in which I-line ultraviolet light from a mercury-vapor lamp having a wavelength of 365 nm or DUV at 248 nm is projected through a first reticle and a focusing lens to obtain an image pattern. The image pattern used may be a grid or any other pattern. Thereafter, the photoresist is developed and the irradiated portions of the photoresist are removed to provide openings in photoresist, as is also shown in FIG. 12B. The resulting openings in the photoresist expose portions of contact surface 333 and define the pattern for the roughening of the contact surface 333 of the air-bearing surface 300.

Figure 12C:
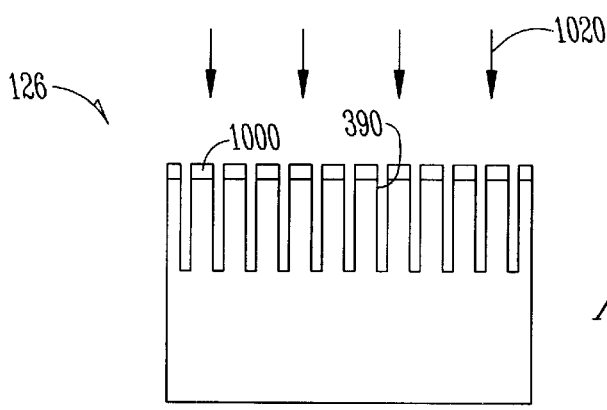

As shown by arrows 1020 in FIG. 12C, an etch is applied that removes some of the exposed portions of contact surface 330 to form the roughened surface 333. Various removal methods, as depicted by arrows in 1020, can be used to selectively remove portions of the slider 126 to form contact surface 333. Preferably, ion milling removes a portion of the slider 126 to form contact surface 333 of the air-bearing surface 300. A typical process for ion milling is to place the substrate onto an ion mill rotating table, where the angle of rotation can be varied so that the ion beam impinges on the surface at a controlled angle, ranging from 0 degrees (incidence normal to the ABS surface) to 90 degrees (incident ion beam traveling in the plane of the substrate ABS surface). Typical incident beam energy is 700 electron volts. A typical removal rate of unprotected ABS surface material is 100 nm/minute. Typical milling times are 1 to 3 minutes. Milling time is typically split between milling angles of 45 and 60 degrees according to a recipe selected to obtain the desired microtexture surface rounding. Various etchants, depicted by arrows 1020, can be used to selectively remove the slider material 126 and form contact surface 333. Preferably, a dry or plasma etch is applied that removes a portion of the contact surface 333 of the air-bearing surface 300. The portion of the contact surface 333 covered by the remaining photoresist 1000 is subjected to the dry or plasma etch 1020 for a selected amount of time. Different plasmas may be used to dry or plasma etch the exposed portions of the contact surface 333. A different plasma may require a different amount of exposure time for removing a selected thickness of slider material at the contact surface 333. A different concentration of ions used in the same type of plasma may also require a different amount of exposure time to remove the exposed slider surface. The exposure time, the makeup of the plasma and the concentration of the ions used in the plasma may all be altered to vary the rate at which the material forming the contact surface 333 of the slider 126 is removed. One example of an etchant is standard ion milling, applied for 3 minutes, in an ion mill chamber.

Figure 12D:
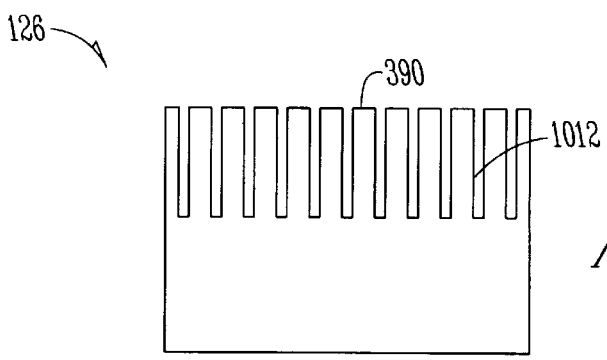

As shown in FIG. 12D, after a selected amount of the material is removed from the slider 126 thereby forming the contact surface 333 with the dry or plasma etch, the remaining photoresist 1000 is stripped (not shown in FIG. 12D). This results in a roughened contact surface 333 on the air-bearing surface 300. The pattern is typically a grid of columns which have a square or diamond cross section. The dry or plasma etch is used in this process since vertical edges 1012 can be made or defined without the undercutting problems associated with wet etch processes. Using this method, the pitch of the pattern generated is limited since the pattern which can be projected by the photolithographic system, such as a step and repeat optical projection system, in which 248 nm ultraviolet light from a mercury-vapor lamp projected through a first reticle and a focusing lens is limited to an image pattern having a pitch of 0.4 $\mu$m. The image pattern used may be a grid or any other pattern. The result is a set of columns 1011 having edges 1012. The roughened contact surface 333 includes these columns 390. Using this method, surface roughnesses in the range of approximately 0.1 to 10 nm are achievable.

Formation of Roughened Surface using Split Laser

According to another embodiment of this invention, the grid pattern on the photoresist is defined by a split laser, rather than by the photolithographic system which uses a step-and-repeat optical projector system in which an I-line ultra-violet light from a mercury vapor lamp or DUV from an excimer laser source is projected through a first reticle and a focusing lens. Use of a laser provides for a much finer pitch pattern, which is formed in the photoresist. The process associated with forming the roughened surface 333, namely the exposure of the photoresist to light as depicted by arrows 1010 in FIG. 12B, is conducted by the split-laser apparatus 1100 shown in FIG. 13. The remaining portions of the photo lithographic process depicted by FIGS. 12A to 12D are the same. Rather than repeat the entire process or description of FIGS. 12A to 12D, the below discussion will focus on the differences between the process for using a split laser and the process which uses the other photolithographic system to expose the photoresist 1000.

Figure 13:
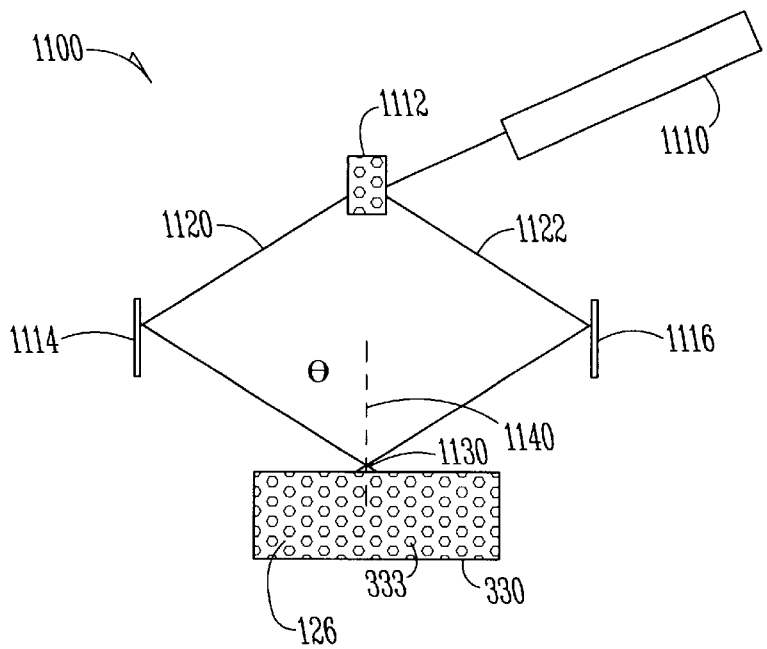
FIG. 13 is a schematic of an apparatus used to expose the photoresist to apply a fine-pitched surface treatment to the slider.

FIG. 13 is a schematic of an apparatus 1100 used to expose the photoresist 1000 and to apply a fine-pitched surface treatment to the contact surface 330 of the center island 310 of the air-bearing surface 300. The apparatus 1100 includes an ultra-violet (UV) laser 1110, a beam splitter 1112, a first split-beam director 1114 and a second split-beam director 1116. The UV laser 1110 produces lased light directed at the beam splitter 1112. At the beam splitter 1112, the lased light is divided into a first laser beam 1120 and a second laser beam 1122. The first beam of lased light 1120 is directed to the first split-beam director 1114 and the second beam of lased light 1122 is directed to the second split-beam director 1116. The first split-beam director 1114 directs the first beam 1120 to the contact surface 330 of the island 310 of the substrate 126. Similarly, the second split-beam director 116 directs the second beam of lased light 1122 toward the contact surface 333 of the center island 310 of the slider 126. The contact surface 330 of the air-bearing surface 300 is coated with a negative-acting or positive-acting photoresist sensitive to deep ultraviolet irradiation. The resist thickness is approximately twice the pitch of the fine pattern which will be formed. The first beam of lased light 1120 and the second beam of lased light 1122 interfere at the surface 333. Portions of the lased light interfere and cancel and other portions of the lased light constructively add together to form an array of light at the contact surface 333. The pitch of the pattern along a line in the plane of the intersecting laser beams 1120 and 1122, and the substrate surface or contact surface 330 is $$\text{Pitch} = \frac{\text{LaserWavelength}}{2*\sin(\theta)}$$

where θ is the laser irradiation angle of incidence with respect to the vector, normal to the substrate or contact surface 333 of the air-bearing surface 300 of the slider 126. The vector is shown as a dotted line carrying the reference numeral 1140. Using the conventional UV-sensitive resists, a pattern pitch of 200 nanometers (nm) is readily achieved. Using DUV resists and an excimer laser, a pattern pitch as small as 100 nm is achievable.

The contact surface 333 is exposed two times. The second exposure is done after the slider and center island 310 have been rotated through a number of degrees. Preferably, the substrate or contact surface 333 is rotated through 90 degrees so that columns having a square shape are formed. The substrate could be rotated through an angle more or less than 90 degrees to form a series of columns having diamond-like cross sections. The resist is developed and a conventional etch process, such as ion milling or a dry or plasma etch is used to remove some of the material at or near the contact surface. The roughened surface 333 is formed after the resist is then removed.

Figure 14:
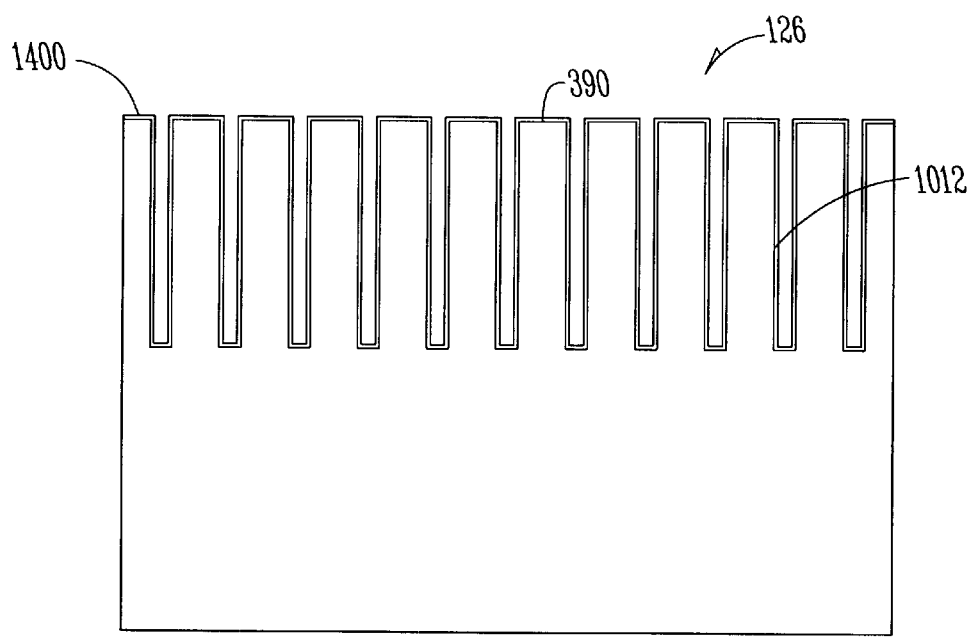
FIG. 14 shows a contact area having diamond-like carbon deposited thereon.

After texturing the contact areas 331, 332, 333, 334, 335, 336, 337, 338 using any of the above-described techniques, a layer of a durable material, such as diamond-like carbon, may be placed onto the contact areas. This enhances wearability of the contact areas 331, 332, 333, 334, 335, 336, 337, 338. FIG. 14 shows an exemplary contact area 333 having a layer of diamond-like carbon 1400 deposited thereon.

Advantageously, a roughened portion of the contact surface reduces the stiction forces produced between the surface of the disk and the slider and allows for reduced friction and frictional heating during an unintended contact event between slider 126 and the disc 134. The roughened contact area 331, 332, 333, 334, 335, 336, 337, 338 of the air-bearing surface 300 not only reduces friction forces between the disk and the slider, but it also provides for reduced frictional heating and reduced data loss during unintended contact events. The resulting air-bearing is rugged and durable. The materials used to form the roughened surface are removed so the only materials remaining are those already in the drive. Thus, outgassing problems are minimal.

Figure 15:
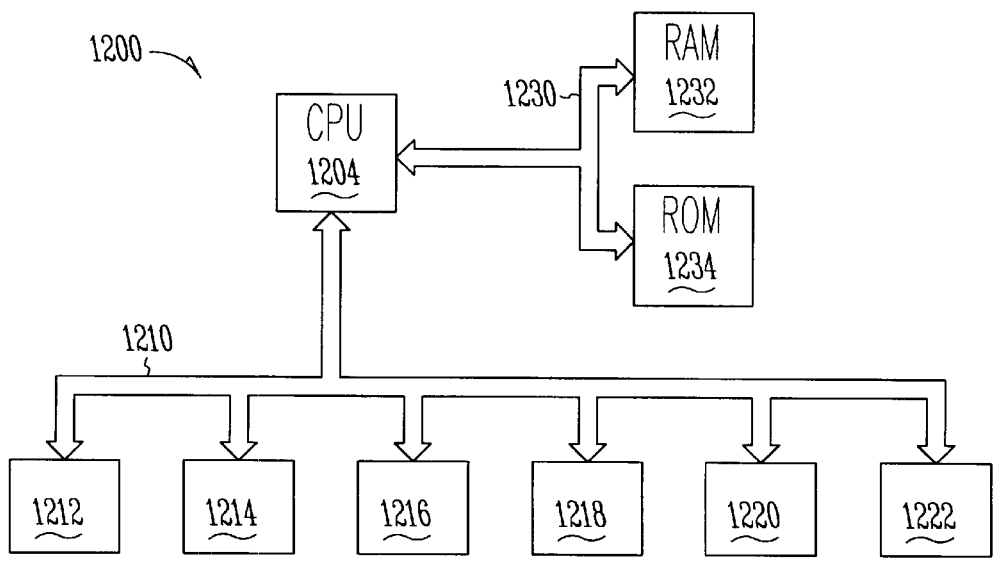
FIG. 15 is a schematic view of a computer system.

FIG. 15 is a schematic view of a computer system. Advantageously, the invention is well-suited for use in a computer system 1200. The computer system 1200 may also be called an electronic system or an information handling system and includes a central processing unit, a memory and a system bus. The information handling system includes a central processing unit 1204, a random access memory 1232, and a system bus 1230 for communicatively coupling the central processing unit 1204 and the random access memory 1232. The information handling system 1200 includes a disk drive device which includes the ramp described above. The information handling system 120 may also include an input/output bus 1210 and several devices peripheral devices, such as 1212, 1214, 1216, 1218, 1220, and 1222 may be attached to the input output bus 1210. Peripheral devices may include hard disk drives, magneto optical drives, floppy disk drives, monitors, keyboards and other such peripherals. Any type of disk drive may use the slider having the surface treatment discussed above.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A slider for a disk drive information handling system comprising:
    a transducer associated with the slider;
    an air-bearing surface further comprised of:
        a contact surface; and
        a non-contact surface, at least a portion of the contact surface positioned near the transducer associated with the slider, wherein at least one portion of the contact surface includes a roughened contact surface.

2. The slider of claim 1 wherein the roughened contact surface is formed using photolithography and dry plasma etching.

3. The slider of claim 1 wherein the roughened contact surface is formed using a phase-selective etchant.

4. The slider of claim 1 wherein the roughened contact surface has a surface roughness, $R_a$, defined by the center line average of asperity heights in the range of 0.1 nm to 10 nm.

5. The slider of claim 1 wherein the roughened contact surface has a surface roughness, $R_a$, defined by the center line average of asperity heights in the range of 1 nm to 7 nm.

6. The slider of claim 1 wherein the air bearing surface includes four corners, wherein at least one of the corners includes the roughened contact surface.

7. The slider of claim 1 wherein the air bearing surface includes four corners, wherein at least two of the corners includes the roughened contact surface.

8. The slider of claim 1 wherein the air bearing surface includes four corners, wherein all of the corners include the roughened contact surface.

9. The slider of claim 1 wherein the air bearing surface includes four corners, a leading edge and a trailing edge, and wherein at least one of the corners near the trailing edge includes the roughened contact surface.

10. The slider of claim 1 wherein the air bearing surface includes four corners, a leading edge and a trailing edge, and wherein at least one of the corners near the leading edge includes the roughened contact surface.

11. The slider of claim 1 wherein the air bearing surface includes a trailing edge, and wherein at least one of the roughened surfaces is near the trailing edge of the slider.

12. A slider for a disk drive information handling system comprising:
    a transducer associated with the slider;

an air-bearing surface further comprised of:
  a leading edge; and
  a trailing edge, the transducer positioned near the trailing edge of the slider; and
  a roughened contact surface positioned near one of the trailing edge or the leading edge of the slider.

13. The slider of claim 12 wherein the roughened surface is near the transducer associated with the slider.

14. The slider of claim 12 wherein the roughened surface is formed by:
  adding a layer of photoresist to the surface of the air-bearing surface to be roughened;
  exposing a portion of the photoresist;
  removing a portion of the photoresist; and
  etching the portion of the contact surface uncovered by photoresist to form the roughened surface.

15. The slider of claim 14 wherein exposing a portion of the photoresist further comprises:
  exposing the photoresist to a light pattern in a first direction; and
  exposing the photoresist to a light pattern in a second direction.

16. The slider of claim 14 wherein exposing the photoresist further comprises:
  emitting light from a laser;
  splitting the emitted light from the laser to form a first laser beam and a second laser beam;
  directing the first laser beam to the surface to be roughened; and
  directing the second laser beam to the surface to be roughened so that the first laser beam and the second laser beam interfere.

17. The slider of claim 14 wherein etching the contact area comprises plasma etching the exposed portions of the contact area.

18. The slider of claim 12 wherein the slider includes at least a portion made of a multi-phase material, wherein the roughened area is formed by applying a phase-sensitive etchant to the multi-phase material to remove a portion of at least one of the phases of the multi-phase material.

19. The slider of claim 18 wherein the multi-phase material includes a selected grain size for at least one phase of the multi-phase material, the grain size selected to produce a selected surface roughness.

20. A slider for a disk drive information handling system comprising:
  a transducer associated with the slider;
  an air-bearing surface further comprised of:
    a contact surface; and
    a non-contact surface, at least a portion of the contact surface positioned near the transducer associated with the slider; and
  means for reducing stiction associated with said contact surface.

* * * * *